UNITED STATES PATENT OFFICE.

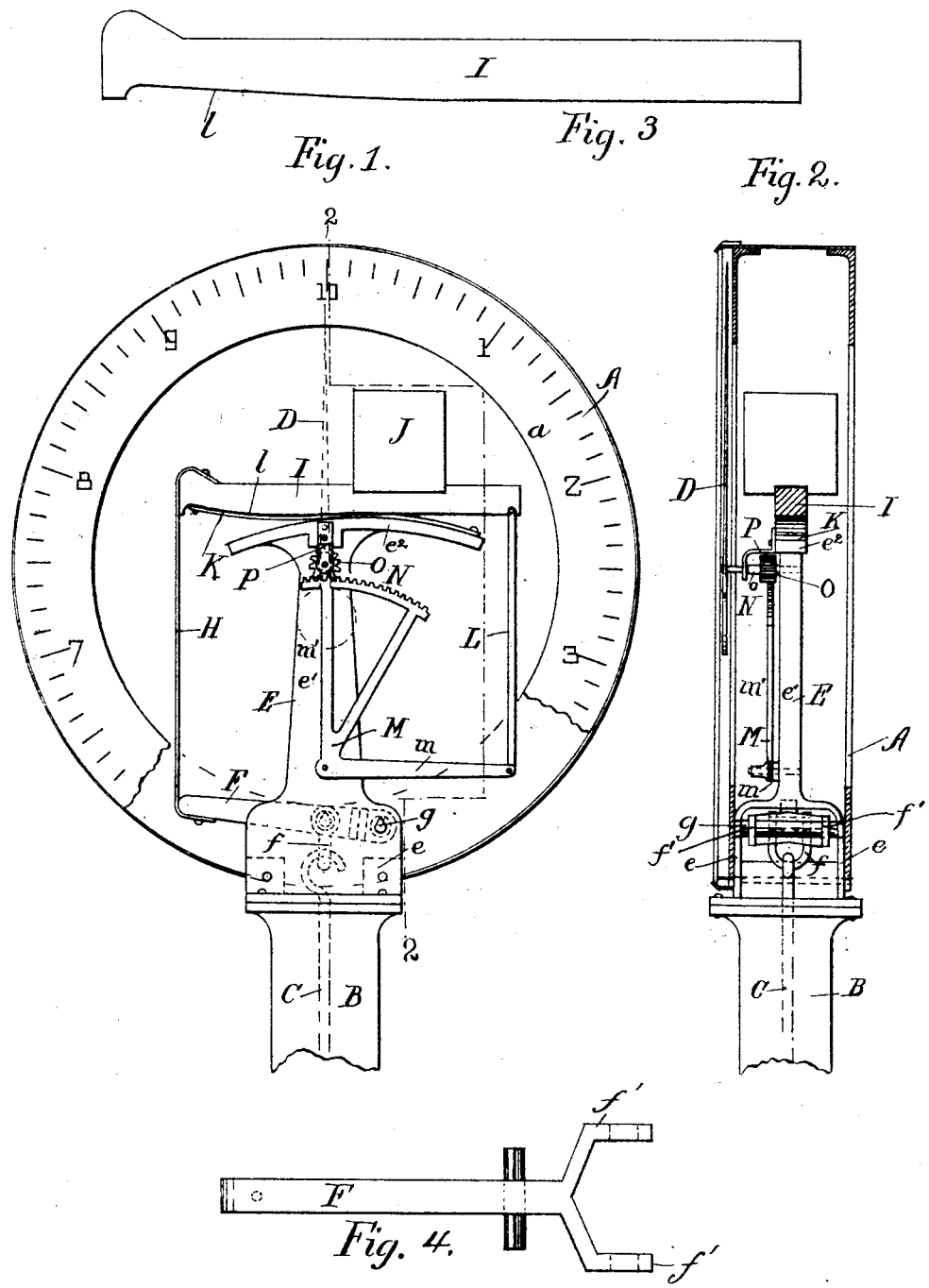

LUTHER C. FARMER, OF MINNEAPOLIS, MINNESOTA, ASSIGNOR TO THE CROWN SYNDICATE, OF MINNESOTA.

PENDULUM-SCALE.

SPECIFICATION forming part of Letters Patent No. 513,177, dated January 23, 1894.

Application filed November 7, 1892. Serial No. 451,209. (No model.)

*To all whom it may concern:*

Be it known that I, LUTHER C. FARMER, a citizen of the United States, residing at Minneapolis, in the county of Hennepin and State of Minnesota, have invented certain new and useful Improvements in Weight or Pressure Indicating Apparatus, of which the following is a specification.

My invention relates to a weight or pressure indicating device of that kind in which a weighted lever having a shifting fulcrum constitutes the counter-balance which is opposed to the weight or pressure to be indicated, which lever is operatively connected with a pointer which travels adjacent to a dial, or to other means whereby is indicated the weight or pressure being measured; and the invention consists of the various improvements in and combinations of the operative parts of the indicating device to be hereinafter set forth.

In the accompanying drawings, wherein my invention is illustrated, Figure 1 is a face view of the apparatus, part of the casing which incloses it being broken away. Fig. 2 is a vertical section on the line 2—2 of Fig. 1. Fig. 3 is a side view of the weight carrying lever, and Fig. 4 is a plan view of the lever to which the platform rod is connected.

In the drawings, A designates the casing in which the operative parts of the apparatus are mounted, the front face of the casing being provided with a graduated dial $a$. The casing is shown as being supported by a standard B, which is hollow, and through it passes the rod C which communicates motion to the mechanism within the casing. This rod may be connected to the platform of a scale, to a movable diaphragm which is subjected to steam or other pressure, or it may be otherwise disposed according to the use to which the indicating apparatus is put. Hereinafter I shall designate the rod C as the platform rod, supposing it to be connected with the platform of a scale.

It is desirable that the casing A should be circular in outline, and that the subdivisions of the dial should be equally distant apart; I have therefore so disposed and combined the parts of the apparatus that they may be conveniently mounted within the casing, and so that the pointer D which moves over the face of the dial moves an equal distance for each added unit of force or weight applied to the platform rod.

E is the standard upon which are mounted the various operative parts of the apparatus. It is arranged within the casing directly above the standard B, to the upper end of which its base or feed portions $e$ are secured, and extends upward somewhat above the center of the casing. This standard consists essentially of three parts—the bifurcated, U-shaped base or feet portion, $e$, the central stem, $e'$, and the laterally extending, curved bearing or head $e^2$.

F is a lever to which the platform rod C is connected by the link $f$. It is mounted between the two feet portions $e$ of the standard E, and its inner end is preferably bifurcated, the two arms, $f'$, thus formed being fulcrumed upon knife-edges $g$ on the standard E. This way of mounting the lever F lessens to a minimum the liability of its having any lateral movements or looseness, and causes it to work true. The lever F is an intermediate lever between the platform rod and the weight lever, I, to which it is connected by a band H, preferably of thin flexible metal, such as brass. The lever or bar I bears upon and is supported by the upper curved end $e^2$ of the standard,—whereby it has a movable fulcrum as it is vibrated,—and carries a weight J, which may be provided with means for adjusting upon and securing it to the rod or lever I.

Instead of the lever I resting directly upon the curved bearing face $e^2$ I interpose between them a strip, K, of thin elastic metal, one end of which is connected with the bearing near its end, and the other end connected with the lever. The width of this strip of metal is preferably the same as the width of the bearing faces of the lever I and its support $e^2$, and it is so secured to them that its edges are parallel thereto. By this arrangement the friction between the lever and its bearing is not materially increased, while the metallic strip interposed between and connecting them prevents any twisting or lateral movement of one relative to the other. The bar or lever I is connected with a bell-crank lever M,—fulcrumed on the standard E,—by a link L, which is preferably arranged vertically. The upright arm $m'$ of the bell-crank lever lies beside the standard E and carries at its upper end a gear segment N, which meshes with a pinion O on the shaft $o$ which carries the pointer or index D. One end of the shaft $o$ is mounted in a hole or recess in the standard, and the other end is supported by a bracket P secured to the standard.

It will be understood that if the rod C be moved downward it will rock the lever I, causing the weight J to be lifted, and that as the lever is rocked, its line of support upon the bearing $e^2$ shifts toward the left or away from the weight, so that the length of its arm of the lever is increased, while the power arm of the lever is shortened, thus causing a constantly increasing weight in order to maintain a continued movement of the lever I. The movements of the weight lever are transmitted to the pointer which, in connection with the dial $a$ indicates the position of the lever and accordingly the amount of force exerted thereon through the platform rod.

In order that the fulcrum line shall properly shift as the lever I is rocked I preferably curve the under or bearing face of the lever from about the center toward the end opposite the weight, as at $l$. It is desirable that the curves of the bearing surfaces should not be too sharp, and by thus curving the lever bearing face, a more gradual curve can be given the left-hand end of the bearing $e^2$.

It will be understood that my invention can be differently embodied from what is shown in the accompanying drawings, in various minor particulars. Thus the weight might be carried by the horizontal arm $m$ of the bell-crank lever M instead of by the lever I; but if such a change were made, the lever I would still be a weighted lever, though the weight were not connected with it directly. Under some circumstances it might be found desirable to curve the under side of the lever, and make the bearing face $e^2$ straight, but I prefer the arrangement shown.

Having thus described my invention, what I claim, and desire to secure by Letters Patent, is—

1. In a weight or pressure indicating apparatus, the combination of the casing, the standard E mounted therein, the platform rod entering the casing beneath the standard, the lever F with which the platform rod is connected, the weighted lever connected with the lever F by the band H, the index or pointer, and the connecting mechanism between the weighted lever and the index, substantially as set forth.

2. In a weight or pressure indicating device, the combination of the casing, the standard E placed therein, and consisting of the bifurcated lower portion $e$, the middle stem part $e'$, and the curved head or bearing face $e^2$, the lever F pivoted between the portions $e$ of the standard, the weighted lever connected with the lever F and bearing on the head $e^2$ of the standard, the pointer having a shaft mounted in the standard and carrying a pinion, and a lever provided with a gear which meshes with the said pinion, and connected with the weighted lever, substantially as set forth.

3. The combination of the casing, the standard E centrally disposed therein, the lever F fulcrumed to the lower portion of the standard and projecting to one side thereof, the weighted lever mounted across the top of the standard upon which it has a shifting bearing, the connection between the outer end of the lever F and one end of the weighted lever, the bell-crank lever M having an arm $m$ projecting away from the standard on the side opposite to the lever F, and an arm $m'$ provided with a segment gear, the arm $m$ being connected with the weighted lever, and the shaft $o$ carrying the pinion with which the said segment gear meshes, and a pointer, substantially as set forth.

4. In a weight or pressure indicating apparatus, the combination of a bearing face, a weighted lever having a shifting support thereon, and the flexible band K placed between the said bearing face and lever, and secured at one end to the lever and at the other end to the bearing, substantially as set forth.

In testimony whereof I affix my signature in the presence of two witnesses.

LUTHER C. FARMER.

Witnesses:
H. M. FARNAM,
J. H. WHITE.